(12) United States Patent
Seifert

(10) Patent No.: US 9,945,361 B2
(45) Date of Patent: *Apr. 17, 2018

(54) STIRLING ENGINE FOR AN EMISSION-FREE AIRCRAFT

(71) Applicant: EADS DEUTSCHLAND GMBH, Munich (DE)

(72) Inventor: Jost Seifert, Manching (DE)

(73) Assignee: EADS DEUTSCHLAND GMBH, Munich (DE)

( * ) Notice: Subject to any disclaimer, the term of this patent is extended or adjusted under 35 U.S.C. 154(b) by 56 days.

This patent is subject to a terminal disclaimer.

(21) Appl. No.: 14/877,102

(22) Filed: Oct. 7, 2015

(65) Prior Publication Data

US 2016/0025075 A1 Jan. 28, 2016

Related U.S. Application Data

(63) Continuation of application No. 13/724,554, filed on Dec. 21, 2012, now Pat. No. 9,238,509.

(51) Int. Cl.
*F03G 6/06* (2006.01)
*F03G 7/06* (2006.01)
(Continued)

(52) U.S. Cl.
CPC .............. *F03G 6/068* (2013.01); *B64C 1/16* (2013.01); *B64C 3/32* (2013.01); *B64D 13/006* (2013.01); *B64D 27/02* (2013.01); *B64D 27/04* (2013.01); *B64D 27/06* (2013.01); *B64D 27/08* (2013.01); *B64D 27/24* (2013.01); *F01B 29/10* (2013.01);
(Continued)

(58) Field of Classification Search
CPC ........ F02G 1/043; F02G 1/0435; F02G 1/044; F02G 1/055; F02G 1/053; F02G 1/0535; F02G 2244/50; F02G 2254/30; F02G 2280/10; F02G 2243/02; F02G 1/057; F02G 2243/30; F25B 9/14; F25B 2309/001; F25B 2309/003; Y02E 10/46; B64D 27/24; B64D 27/02; B64D 27/06; B64D 27/04; B64D 27/08; B64D 2027/026; B64D 13/006; B64C 1/16; B64C 3/32

See application file for complete search history.

(56) References Cited

U.S. PATENT DOCUMENTS 2,049,066 A 7/1936 Kindelberger et al.
4,414,814 A 11/1983 White
(Continued)

FOREIGN PATENT DOCUMENTS

DE 42 16 839 5/1992
EP 2 258 947 12/2010
(Continued)

*Primary Examiner* — Mark Laurenzi
*Assistant Examiner* — Wesley Harris
(74) *Attorney, Agent, or Firm* — Greenblum & Bernstein, P.L.C.

(57) ABSTRACT

Aircraft with an emission-free drive and method for emission-free driving of an aircraft. The aircraft includes a drive device structured and arranged to generate thrust, a lift device structured and arranged to generate lift, and a heat engine structured and arranged to convert thermal energy into kinetic energy to drive the drive device. The heat engine includes at least one flat-plate Stirling engine drivable by solar thermal radiation.

5 Claims, 11 Drawing Sheets

(51) Int. Cl.
*B64D 27/06* (2006.01)
*B64D 27/02* (2006.01)
*F01B 29/10* (2006.01)
*F02G 1/04* (2006.01)
*B64D 27/08* (2006.01)
*B64D 27/04* (2006.01)
*B64D 13/00* (2006.01)
*F02G 1/057* (2006.01)
*F02G 1/044* (2006.01)
*F25B 9/14* (2006.01)
*F02G 1/05* (2006.01)
*B64C 1/16* (2006.01)
*B64C 3/32* (2006.01)
*B64D 27/24* (2006.01)
*F02G 1/043* (2006.01)
*F02G 1/055* (2006.01)
*F02G 1/053* (2006.01)

(52) U.S. Cl.
CPC ............... *F02G 1/04* (2013.01); *F02G 1/043* (2013.01); *F02G 1/044* (2013.01); *F02G 1/0435* (2013.01); *F02G 1/053* (2013.01); *F02G 1/055* (2013.01); *F02G 1/057* (2013.01); *F02G 1/0535* (2013.01); *F03G 7/06* (2013.01); *F25B 9/14* (2013.01); *B64D 2027/026* (2013.01); *F02G 2243/02* (2013.01); *F02G 2243/30* (2013.01); *F02G 2244/50* (2013.01); *F02G 2254/30* (2013.01); *F02G 2280/10* (2013.01); *F25B 2309/001* (2013.01); *F25B 2309/003* (2013.01); *Y02E 10/46* (2013.01); *Y02T 50/62* (2013.01)

(56) References Cited

U.S. PATENT DOCUMENTS

| | | | |
|---|---|---|---|
| 4,415,133 A | 11/1983 | Phillips | |
| 4,438,760 A * | 3/1984 | Radebold | B01J 19/127 126/690 |
| 4,444,011 A * | 4/1984 | Kolin | F02G 1/053 60/517 |
| 4,821,516 A | 4/1989 | Isshiki | |
| 5,337,563 A * | 8/1994 | Weber | F02G 1/043 60/520 |
| 5,810,284 A * | 9/1998 | Hibbs | B64C 39/10 244/13 |
| 8,596,060 B2 * | 12/2013 | Gandhi | F03G 6/00 60/517 |
| 9,080,450 B2 | 7/2015 | Seifert | |
| 2002/0112479 A1* | 8/2002 | Keefer | F02B 43/10 60/651 |
| 2005/0242232 A1* | 11/2005 | Bennett | B64D 27/24 244/53 R |

FOREIGN PATENT DOCUMENTS

WO         96/06274      2/1996
WO    2008/121774    10/2008

* cited by examiner

STIRLING ENGINE FOR AN EMISSION-FREE AIRCRAFT

CROSS-REFERENCE TO RELATED APPLICATIONS

The present application is a Continuation of U.S. application Ser. No. 13/724,554 filed Dec. 21, 2012, which claims priority under 35 U.S.C. § 119(a) of German Patent Application No. 10 2011 122 072.4 filed Dec. 22, 2011, the disclosures of which are expressly incorporated by reference herein in their entireties.

BACKGROUND OF THE INVENTION

1. Field of the Invention

The invention relates to an aircraft with an emission-free drive and a method for driving an aircraft.

2. Discussion of Background Information

Aircraft, for example, airplanes, generally have a drive device, for example, a turbine or a propeller, which is driven, e.g., by an internal combustion engine. In connection with the findings on global warming, efforts are currently being made to reduce the $CO_2$ discharge caused by operating an airplane. For example, electric motors are being tested for their operational capability in aircraft, in particular in airplanes. The batteries necessary for this are not yet available according to today's prior art. However, there are small flight demonstrators, such as for example the electric flying Cri-Cri from EADS, which have demonstrated the fundamental feasibility of electric flight with small aircraft. Furthermore, there are solar aircraft, such as the Solarimpuls, which also render flight possible at night, in that solar energy is converted by solar cells into electric current during the day and is stored in batteries, which then drive an electric motor at night.

A solar-powered aircraft is known from WO 2008/121774 A2. To operate a heat engine in the form of a Stirling engine, a thermal battery with a heat storage medium is provided, as well as a solar thermal collector provided in the transparent fuselage. Since the aircraft is aligned differently to the sun during flight operation, a moveable parabolic reflector is provided with a thermal collector running centrally, which transports the heat to the thermal reservoir. Flat-plate Stirling engines are known, for example, from U.S. Pat. No. 4,414,814, DE 42 16 839 C1, WO 96/06274 or EP 2 258 947 A1.

SUMMARY OF THE EMBODIMENTS

Embodiments of the invention provide an aircraft with the lightest possible drive with a reduced $CO_2$ discharge based on the operation.

Accordingly, embodiments are directed to an aircraft with an emission-free drive that includes a drive device for generating a thrust, a lift device for generating a lift, and a heat engine for converting thermal energy into kinetic energy for driving the drive device. At least one flat-plate Stirling engine that can be driven by solar thermal radiation is provided as a heat engine. Moreover, embodiments are directed to a method for driving an aircraft that includes feeding of solar thermal energy to a flat-plate Stirling engine, conversion of the thermal energy into kinetic energy by the flat-plate Stirling engine, and driving a drive device by the flat-plate Stirling engine.

According to embodiments, an aircraft with an emission-free drive is provided, which has a drive device for generating a thrust, a lift device for generating a lift and a heat engine for converting thermal energy into kinetic energy for driving the drive device. At least one flat-plate Stirling engine that can be driven by solar thermal radiation is provided as a heat engine.

A "flat-plate Stirling engine" is a Stirling engine in which a displacer with intermittent control is provided. The displacer operates with very low temperature difference, which is due to the fact that the system of the flat plate has a larger heat transfer surface in proportion to the working volume. A surface also referred to as front wall is thereby heated, according to the present invention, in particular by solar insolation. Flat-plate Stirling engines are suitable for converting thermal energy, which is provided by the solar thermal radiation, into kinetic energy. Flat-plate Stirling engines can already be driven at low temperature differences, for example at a temperature difference of approx. 15°. Due to their active principle, flat-plate Stirling engines can be realized with relatively light components. Due to the use of the solar thermal radiation as a heat source, which is unavoidable for the operation of the flat-plate Stirling engine, an emission-free drive, i.e., a drive with reduced $CO_2$ discharge, is possible.

The term "aircraft" also comprises airplanes and in particular manned and unmanned airplanes. However, "aircraft" is also understood to mean airships as well as balloon vehicles.

The drive device is, for example, a propeller drive with one or more propeller units.

The lift device comprises, for example, a body filled with a lift-generating fluid of an airship or a balloon vehicle.

The lift device can also comprise a wing device with an airfoil section for generating a lift (with correspondingly simultaneous thrust to generate the necessary flow). The term "wing device" also comprises, for example, the lift devices embodied or formed integrally with a fuselage construction in the case of all-wing aircraft.

According to embodiments, several flat-plate Stirling engines can be provided, e.g., based on the flight direction next to one another or one behind the other, or also arranged distributed at several points.

According to embodiments of the invention, the lift device comprises a wing device with an airfoil section for producing a lift, in which the flat-plate Stirling engine is arranged in the wing device.

A flat-plate Stirling engine can thus be provided, which has a surface that is as large as possible exposed to solar thermal radiation.

Moreover, the flat-plate Stirling engine can optimally utilize the cross-sectional geometry of the airfoil section, which is also shown by the following.

According to embodiments of the invention, the flat-plate Stirling engine includes:

- a working chamber filled with a working gas with a top and an underside and a changeable working volume;
- a displacer held in a moveable manner in the working chamber between the top and the underside;
- a regenerator arranged in the working chamber for collecting and delivering thermal energy contained in the working gas;
- a working piston connected to the working chamber for changing the working volume;
- an inertia element held in a rotatable manner;
- a drive, connected to the inertia element, for driving the drive device; and a transmission device for the mechanically coupling connection of the displacer and of the working piston with the inertia element.

The working chamber is arranged in the lift device, and the working gas can be heated from a top of the lift device by the solar thermal radiation.

The alignment of the top to the solar thermal radiation results during flight operation, since the top always points upwards and thus in the direction of the solar insolation. The solar insolation, to put it simply, causes a heating of the working gas in the region above the displacer, such that the working gas expands and presses the working piston outwards. Subsequently, a cooling takes place and thus a contraction of the working gas in the upper region and a new movement of the working piston occurs, whereupon a new step of heating and expanding begins again. It is decisive hereby that the displacer transports the working gas to and fro between the hot top and the cold underside in order to achieve a quick cooling or heating of the working gas.

The inertia element is, for example, a propeller device of the drive device. The inertia element can also be embodied or formed as a flywheel.

Instead of the inertia element, a device can also be provided for converting the linear movement into a rotational movement.

According to an alternative example, instead of the inertia element, a direct output is also provided via the linear movement of the working piston to generate a linear movement for a drive based thereon.

The transmission device has, for example, a first push-rod connection, which couples the displacer to a first pivot point on the inertia element, and a second push-rod connection, which couples the working piston to a second pivot point on the inertia element. The first pivot point is arranged on the inertia element offset by 90° in its rotational angle position in the direction of rotation in front of the second pivot point.

The working piston is held in a moveable manner in a working cavity, wherein the working piston represents a moveable wall surface of the working chamber.

According to a further embodiment of the invention, the working chamber is embodied or formed between the top of the wing and the underside of the wing. The displacer divides the working chamber into a first and a second chamber region. The displacer is embodied or formed such that, with movement, it displaces working gas from the one into the other chamber region. The top of the wing forms a first side of the flat-plate Stirling engine with a first temperature and the underside of the wing forms a second side of the flat-plate Stirling engine with a second temperature. The second temperature is lower than the first temperature.

The first chamber region is an upper chamber region and the second chamber region is a lower chamber region.

The working gas can be coolable, i.e., cooled from an underside of the lift device, e.g., on the underside of the wing. The wing device can have a heat-conducting chamber wall in the region of the working chamber, e.g., an aluminum sheet located, e.g., in the region of the working chamber on the underside.

The first side forms a hot side and the second side forms a cold side of the flat-plate Stirling engine.

With movement of the displacer, working gas flows through the regenerator. This is embodied or formed such that, when flowed through with the working gas, thermal energy contained in the working gas is delivered or collected.

In the front region of the airfoil profile, i.e., towards the nose edge, a wall running between the top of the wing and the underside of the wing can be provided, which closes the working chamber with respect to a front region.

The flat-plate Stirling engine can be used for wing statics, i.e., incorporated in a supporting manner in the support structure of a wing.

The airfoil section can have a leading edge and a trailing edge, in which the displacer is held in a pivotable manner in the region of the trailing edge and in which the displacer forms a plate curved in the direction of the airfoil profile.

The displacer can include, for example, a fiberboard with heat insulation property, which has a dark color on the top, e.g., a foam board.

According to a further embodiment of the invention, the lift device in the region of the working chamber on the top has a light-transmitting cover in order to render possible a direct heat radiation into the working chamber.

The cover or the outer skin of the wing device forms a chamber wall in the region of the working chamber, whereby fewer components result in total.

According to a further embodiment of the invention, a power-generating device for generating electric energy for driving the aircraft is provided.

According to a further embodiment of the invention, the power-generating device comprises a generator device for converting kinetic energy into electric energy. The generator device can be driven by the flat-plate Stirling engine.

The generator device can be detachably coupled with the inertia element.

The generator device can be, for example, a linear generator which converts the linear movement of the working piston into electric energy.

According to a further embodiment of the invention, the power-generating device has photovoltaic elements for converting solar radiation into electric energy.

According to an embodiment of the invention, the photovoltaic elements are arranged on the top of the displacer.

The photovoltaic elements can be arranged, for example, in regions on the top of the aircraft.

According to an embodiment of the invention, the power-generating device has a fuel cell device, which feeds the heat released with the operation of a fuel cell to the working chamber of the flat-plate Stirling engine.

According to an embodiment of the invention, a heating device for heating the working gas is provided in one of the two chamber regions of the working chamber of the flat-plate Stirling engine.

A support of the flat-plate Stirling engine operation can take place, for example, when the solar heat radiation is present only in a reduced manner, or the input of the thermal energy of the solar heat radiation can also be replaced by the heating device, for example, when no solar thermal radiation is present, such as during a night flight, for example.

The heating device can have, for example, a combustion device operated with a fuel. A storage device can be provided to store the fuel.

For example, the fuel used can be obtained from sustainable raw materials in order to provide a flight operation that is as $CO_2$-reduced or $CO_2$-neutral as possible.

The heating device can have, for example, an electric heating device for converting electric energy into thermal energy.

According to an embodiment of the invention, the heating device has an electric heating device for converting electric energy into thermal energy. The electric heating device is integrally embodied or formed in the displacer.

For example, the electric heating device is a heating coil that is arranged in one of the two chamber regions in order to heat the working gas in this region.

The electric heating device can be embodied or formed, for example, as a heating surface of the displacer that can be operated electrically.

The storage and delivery of the electric energy by the storage device can take place at different phases.

For example, an electric motor is provided, which is connected to the drive device, and which can be operated with electric energy from the power-generating device.

According to an embodiment of the invention, a storage device for storing and delivering the electric energy generated by the power-generating device is provided. The power-generating device feeds electric energy to the storage device. The storage device stores the fed electric energy and makes it available for driving the aircraft.

The storage device can deliver the electric energy, for example, to the electric heating device.

The storage device delivers the electric energy, for example, to an electric motor, which is connected to the drive device.

According to a further example of the invention, the flat-plate Stirling engine is combined with photovoltaic elements, which drive an electric motor in addition to the flat-plate Stirling engine, in order to operate the drive device with both drive sources.

According to a further example of the invention, the flat-plate Stirling engine is combined with photovoltaic elements, and with a battery device and an electric motor, in order to provide electric energy for operating the electric motor for driving the drive device during the nighttime hours, for example.

According to a further example of the invention, the flat-plate Stirling engine is connected to a generator, which charges a battery device, in order to operate an electric motor with the stored electric energy, for example, during nighttime hours, in order to operate the drive device. The electric motor can also at the same time act as the referenced generator, for example, or in the reverse operating mode.

According to a further example of the invention, the flat-plate Stirling engine is provided combined with photovoltaic elements and a battery, as well as with a heating device, which can be operated with the electric energy that is stored in the battery.

According to a further exemplary embodiment of the invention, the flat-plate Stirling engine is combined with a generator, in order to be able to charge a battery, with which in turn a heating device can be operated during the nighttime hours, for example.

According to a further example of the invention, the flat-plate Stirling engine is embodied or formed combined with a heating device, which is operated with a fuel, in order for example to support the operation of the flat-plate Stirling engine during the day or also to render possible the operation of the flat-plate Stirling engine at night at all.

According to a further example of the invention, the flat-plate Stirling engine is combined with photovoltaic elements with which a heating device is operated, which supports the operation of the flat-plate Stirling engine.

For example, the flat-plate Stirling engine (FSM) is provided in combination with the following components:
  FSM+photovoltaic elements+electric motor;
  FSM+photovoltaic elements+battery+electric motor;
  FSM+generator+battery, wherein also possible: generator=electric motor;
  FSM+photovoltaic elements+battery+electric heating device;
  FSM+generator+battery+electric heating device;
  FSM+heating device, operated with fuel;
  FSM+photovoltaic elements+heating device.

According to a further aspect of the invention, the flat-plate Stirling engine is combined with the cited elements of energy conversion and energy storage in order to, for example, temporarily achieve a particularly high flying speed.

Moreover, according to the invention, a method for driving an aircraft includes:
  a) feeding of solar thermal energy to a flat-plate Stirling engine;
  b) conversion of the thermal energy into kinetic energy by the flat-plate Stirling engine; and
  c) driving a drive device by the flat-plate Stirling engine.

According to an embodiment of the invention it is provided that:
  i) in a first phase, kinetic energy of the flat-plate Stirling engine is converted into electric energy and is stored as electric energy; and
  ii) in a second phase, the stored electric energy is converted into thermal energy in an electric heating device and drives the Stirling engine in order to provide the kinetic energy for driving the drive device.

The first phase is provided, for example with existing solar thermal radiation and the second phase with reduced or non-existent solar thermal radiation, for example, at night.

According to embodiments, a flat-plate Stirling engine is placed in an aircraft in order to provide the drive energy for generating the thrust. Solar thermal radiation is utilized as an energy source for the operation of the flat-plate Stirling engine, which represents a heat engine. The flat-plate Stirling engine, due to its possible lightweight design, can be connected well to the other boundary conditions of an aircraft, for example, of an airplane. In addition to the parameter of weight, here in particular the installation space also plays a decisive role as a second parameter. Since the flat-plate Stirling engine when operated with solar thermal radiation should also be exposed to the solar thermal radiation over as large a surface as possible, the flat-plate Stirling engine can be integrated in the region of the enveloping surfaces pointing upwards. The flat design means only a negligible restriction of the usable volume. For example, the flat-plate Stirling engine can be inserted into the upper region of an airplane fuselage without too much installation space being lost therewith in the interior of, for example, a passenger cabin. A particularly efficient arrangement can be achieved in that the flat-plate Stirling engine is installed in the wing or wings in an integrated manner, since the wings to generate lift always have a wing geometry that inevitably encloses a certain volume. This wing volume, which is used, for example, to accommodate fuel tanks, can therefore be used for the accommodation of a flat-plate Stirling engine, which replaces the normal operation with fossil fuels such as kerosene. In order to provide an operation of the flat-plate Stirling engine, i.e., an operation of the aircraft, for example an airplane, even when the solar thermal radiation is reduced or is not even present at all, an embodiment of the invention provides additional energy sources via energy storage devices in these operating phases, in order to generate the thrust for the operation of the aircraft. If, for example, the solar energy available during the day is used in the case of the energy storage and, for example, electric energy is stored by photovoltaic elements, an overall emission-free flight operation can be provided therewith. An emission-free flight operation is likewise possible when a generator is operated in addition to the thrust device by the Stirling engine during the day, in order to generate electric energy, which then is stored in an energy storage device, such as a battery device, for example, in order to provide this at night in order to generate thermal energy which is then available to the flat-plate Stirling engine for operation, or also electric energy for driving the thrust device. A further possibility for ensuring an emission-free operation also lies in that as an additional energy source, for example, for the direct drive of the thrust device, or also for supplying thermal energy to the flat-plate Stirling engine, in order to also be able to operate it at night, sustainable raw materials are provided or also hydrogen generated by regenerative energy sources, which can be used in the operation of a fuel cell.

Embodiments of the invention are directed to an aircraft with an emission-free drive. The aircraft includes a drive device structured and arranged to generate thrust, a lift device structured and arranged to generate lift, and a heat engine structured and arranged to convert thermal energy into kinetic energy to drive the drive device. The heat engine includes at least one flat-plate Stirling engine drivable by solar thermal radiation.

According to embodiments, the lift device can include a wing device with an airfoil section structured and arranged to generate lift, and the flat-plate Stirling engine may be arranged in the wing device.

In accordance with other embodiments of the present invention, the flat-plate Stirling engine may include a working chamber filled with a working gas and having a top and an underside and a changeable working volume, a displacer structured and arranged to be moveable in the working chamber between the top and the underside, a regenerator structured and arranged in the working chamber to collect and deliver thermal energy contained in the working gas, a working piston connected to change a working volume of the working chamber, an inertia element structured and arranged in a rotatable manner, a drive structured and arranged to be connectable to the inertia element to drive the drive device, and a transmission device structured and arranged to mechanically couple the displacer and the working piston with the inertia element. The working chamber can be located in the lift device and the working gas may be heatable from a top of the lift device by the solar thermal radiation. The displacer may be structured and arranged to divide the working chamber into a first and a second chamber region and, with movement, to displace the working gas from one of the first and second chamber region into the other of the first and second chamber region. A top of the wing can form a first side of the flat-plate Stirling engine with a first temperature and the underside of the wing can form a second side of the flat-plate Stirling engine with a second temperature. The second temperature may be lower than the first temperature. Further, a heating device may be structured and arranged to heat the working gas in one of the first and second chamber regions of the working chamber. The heating device can include an electric heating device integrally embodied in the displacer that is structured and arranged to convert electric energy into thermal energy. Still further, a light-transmitting cover may be arranged in the lift device in the top region of the working chamber.

According to further embodiments, a power-generating device can be structured and arranged to generate electric energy to drive the aircraft. The power-generating device can include a generator device structured and arranged to convert kinetic energy into electric energy and to be driven by the flat-plate Stirling engine. The power-generating device may include photovoltaic elements for converting solar radiation into electric energy. The photovoltaic elements can be arranged on a top of the displacer. The power-generating device can include a fuel cell device, and heat released with operation of a fuel cell may be fed to a working chamber of the flat-plate Stirling engine. Further, a storage device may be structured and arranged to store and deliver the electric energy generated by the power-generating device. The power-generating device can be arranged to feed the electric energy to the storage device and the storage device can be structured and arranged to store the electric energy and to make the stored electric energy available for driving the aircraft.

Embodiments of the instant invention are directed to a method for emission-free driving of an aircraft. The method includes receiving solar thermal energy by a flat-plate Stirling engine, converting the thermal energy into kinetic energy via the flat-plate Stirling engine, and driving, via the flat-plate Stirling engine, a drive device.

In further embodiments, the method can include, in a first phase, converting kinetic energy of the flat-plate Stirling engine into electric energy and storing the electric energy, and in a second phase, converting the stored electric energy into thermal energy in an electric heating device, and driving the Stirling engine to provide the kinetic energy for driving the drive device.

Embodiments of the invention are directed to an aircraft with at least one heat engine arranged in at least one of a wing and a fuselage. The aircraft includes a working chamber, having a top and an underside filled with a working gas, being located in the at least of the wing and fuselage, a displacer structured and arranged for movement between the top and the underside of the working chamber to a define a first and a second chamber region, and a heating region located in a region of the top of the working chamber to receive solar thermal radiation through the at least one of the wing and fuselage to heat the working gas.

According to embodiments of the invention, the heat engine may include a flat-plate Stirling engine.

In accordance with other embodiments of the invention, the aircraft can further include a regenerator structured and arranged in the working chamber to collect and deliver thermal energy contained in the working gas, a rotatable inertia element, and a driver structured and arranged to be connectable to the rotatable inertia element to drive a thrust drive.

According to still other embodiments, the aircraft may include an electric heating device one of integral with and coupled to the displacer to heat the working gas.

In accordance with still yet other embodiments of the present invention, a storage device may be structured and arranged to store and deliver electric energy generated by a power-generating device coupled to the heat engine to convert kinetic energy into electric energy.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
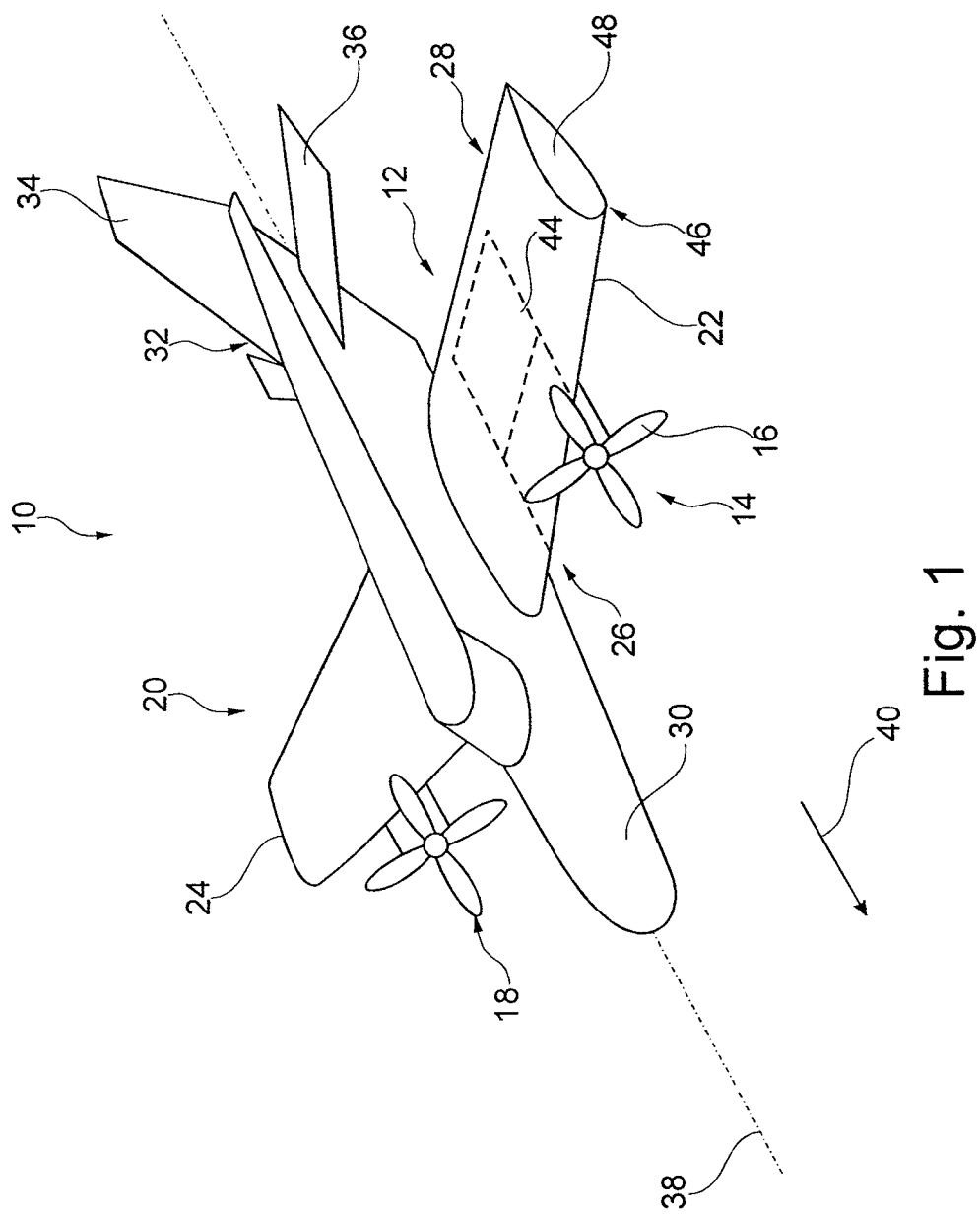
FIG. 1 illustrates an aircraft with an emission-free drive according to an exemplary embodiment of the invention.

FIG. 1 shows a first example of an aircraft 10 with an emission-free drive 12, which is explained in more detail in the following figures. The aircraft 10 has a drive device 14 for generating a thrust, for example in the form of two propeller devices 16, 18. Moreover the aircraft 10 has a lift device 20 for generating a lift, for example, in the form of two lateral wings 22, 24.

Furthermore, a heat engine 26, not shown in detail, is provided for converting thermal energy into kinetic energy for driving the drive device. To this end, according to the present embodiments of the invention, at least one flat-plate Stirling engine 28 is provided as a motor, which can be driven by solar thermal radiation (not shown in FIG. 1).

The aircraft is, for example, an airplane, particularly manned and unmanned airplanes can be provided. Moreover, in addition to an airplane, embodiments of the invention include airships, which are, however, not shown in detail.

FIG. 1 shows by way of example an aircraft 10, e.g., a manned aircraft, that has diagrammatically an airplane tip 30 and a tail region 32. A tailplane 34 and an elevator unit 36 are indicated in the tail region 32. A dashed line 38 designates a longitudinal axis of the airplane, and a direction arrow 40 shows the flight direction.

Figure 2:
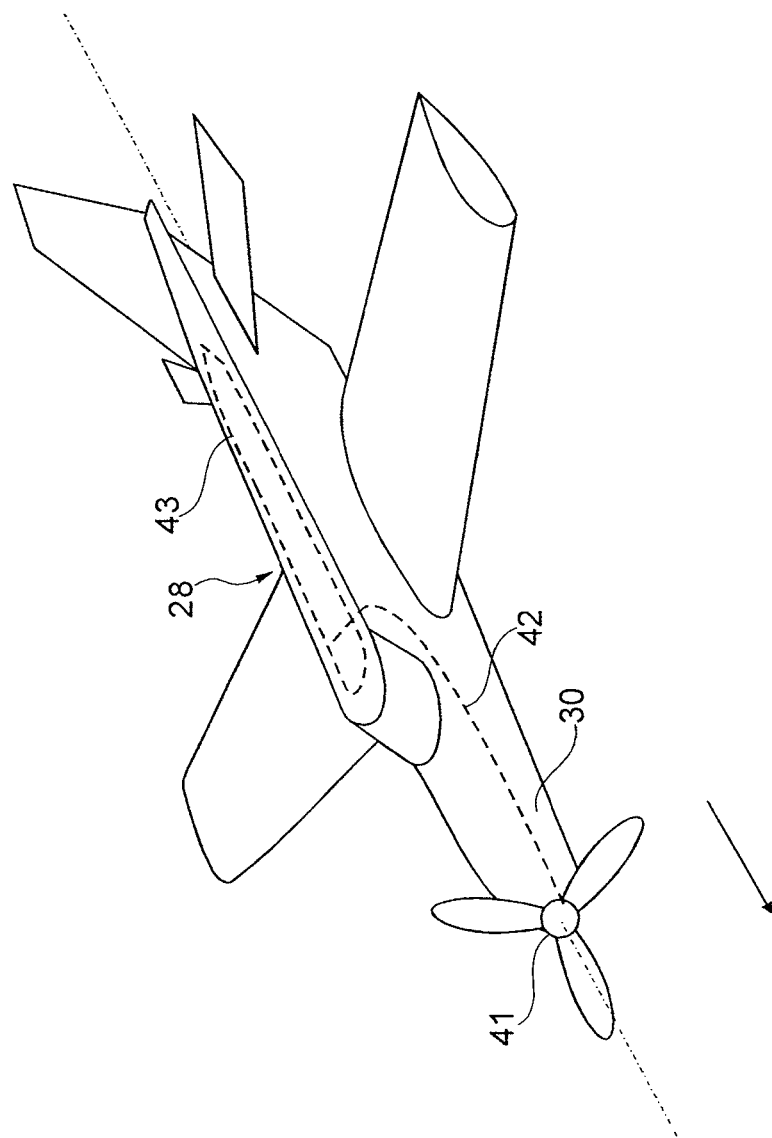
FIG. 2 illustrates a further exemplary embodiment of an aircraft according to the invention.

FIG. 2 shows a further exemplary embodiment in which, instead of the two propeller devices 16, 18, a propeller device 41 provided in the region of the airplane tip 30 is shown.

Naturally, a larger number of propeller devices can also be provided. For example, the propeller device 41 can be combined with the two propeller devices 16, 18 or with two or more propeller devices along the wings. Moreover, more than two propellers 16, 18 can be arranged along the wings without propeller 41.

The flat-plate Stirling engine 28 can be embodied or formed, for example, in an upper region of the fuselage construction, as is shown with a dashed line 43 in FIG. 2, in order to drive via a connection 42, the center propeller of the propeller device 41.

Alternatively or additionally, in FIG. 1 it is indicated by a dashed line 44 that the flat-plate Stirling engine 28 is integrated into the lift device 20. In other words, the lift device 20, which comprises a wing device 46 with an airfoil section 48 for generating a lift, serves to accommodate the at least one flat-plate Stirling engine 28.

The flat-plate Stirling engine 28 is explained in more detail with reference to FIG. 3, in which the flat-plate Stirling engine 28 is shown accommodated in the wing device 46. However, it is understood that the flat-plate Stirling engine 28 can also be provided at other locations, such as, e.g., in the upper fuselage region or also in the front region of the airplane.

The flat-plate Stirling engine 28 has a working chamber 52 filled with a working gas 50, and includes a top 54 and an underside 56 and a changeable working volume 58. Moreover, a displacer 60 is held in the working chamber 52 in a moveable manner between the top 54 and the underside 56. Furthermore, a regenerator 62 is arranged in the working chamber 52 for collecting and delivering thermal energy contained in the working gas 50. Furthermore, a working piston 64 is connected to the working chamber 52. The working piston 64 is used to change the working volume 58. Furthermore, an inertia element 66 is held in a rotatable manner, and an output 68 is connected to the inertia element 66 for driving the drive device, for example, the propeller 16 or 18 and/or 41. Moreover, a transmission device 70 mechanically couples the displacer 60 and the working piston 64 to the inertia element 66. The working chamber 52 is arranged in the lift device and the working gas 50 can be heated by solar thermal radiation, indicated symbolically by arrows 74, from a top 72 of the lift device.

The transmission device 70 has a first push rod connection 75 which couples the displacer 60 at a first pivot point 76 of the inertia element 66. Moreover, the transmission device 70 has a second push rod connection 78, which couples the working piston 64 at a second pivot point 80 of the inertia element 66. The first pivot point 76 on the inertia element 66 is arranged offset by 90° in its rotation angle position in a rotation direction 82 in front of the second pivot point 76.

The working piston 64 is held in a moveable manner in a working cavity 84 and forms a moveable wall surface of the working chamber 52.

Figure 3:
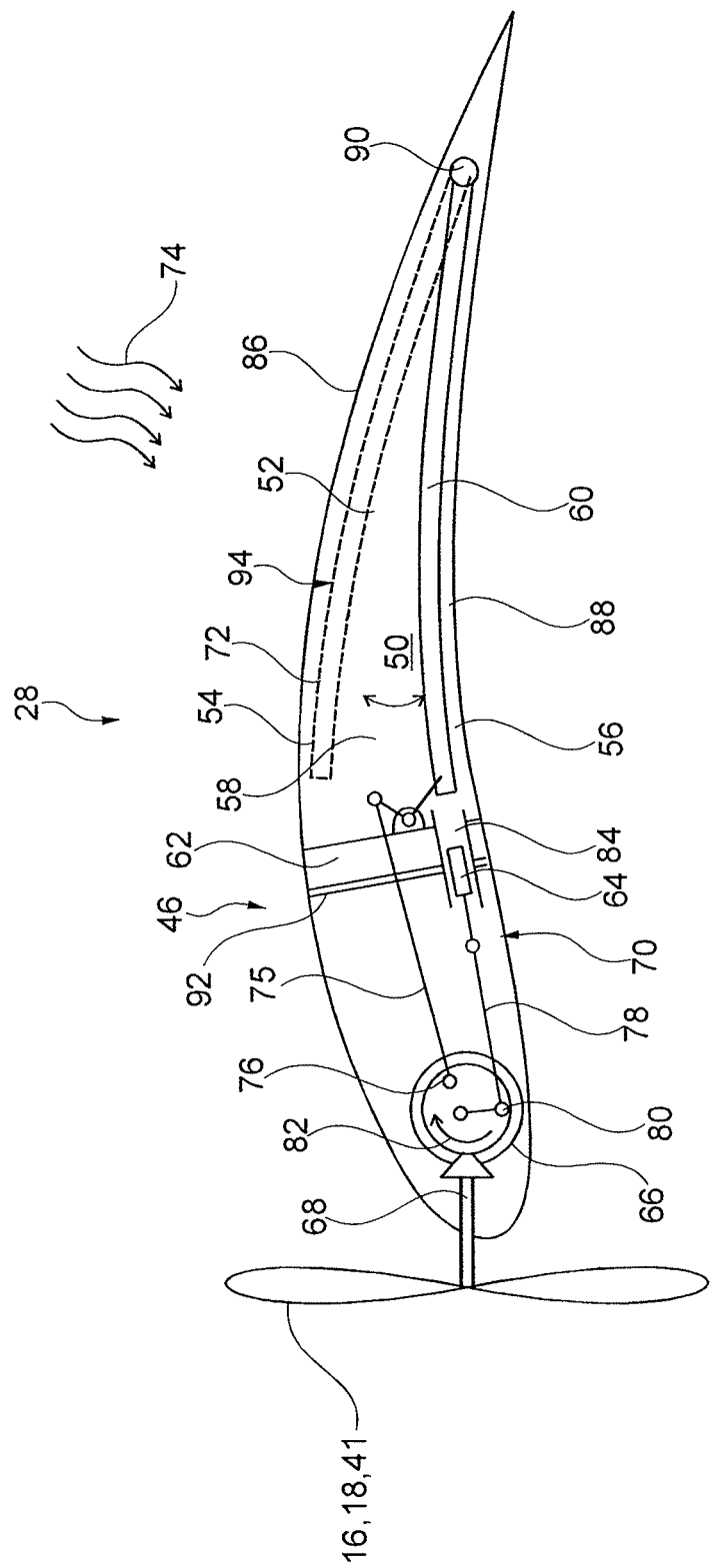
FIG. 3 illustrates a diagrammatic section through a wing device of an aircraft according to an exemplary embodiment of the invention.

As indicated diagrammatically in FIG. 3, the working chamber 52 is embodied or formed between a top of a wing 86 and an underside of a wing 88. The displacer 60 divides the working chamber 52 into a first, i.e., upper chamber region and a second, i.e., lower chamber region. The displacer 60 is thereby embodied or formed so that with movement about a pivot point 90, working gas 50 is displaced from the one chamber region into the other chamber region. The top of the wing 86 thereby forms a first side of the flat-plate Stirling engine 28 with a first temperature, and the underside of the wing 88 forms a second side of the flat-plate Stirling engine 28 with a second temperature. The second temperature is lower than the first temperature.

For example, an aluminum sheet can be provided on the underside 88 for cooling.

With movement of the displacer 60, working gas 50 flows through the regenerator 62, which is sealed to the front region of the wing cavity by a bulkhead 92. The bulkhead 92 forms a wall running between the top of the wing and the underside of the wing which closes the working chamber 52 with respect to the front region.

The flat-plate Stirling engine 28 can be embodied or formed, for example, between adjacent rib constructions of the wing, and the bulkhead 92 can be embodied or formed in connection with an airfoil section running in the longitudinal direction. The flat-plate Stirling engine 28 can be used, for example, for wing statics or be integrated into the support structure concept. According to embodiments, several flat-plate Stirling engines can also be embodied or formed in the longitudinal direction of the wing, which runs transversely to the actual flight direction, i.e., the longitudinal axis 38 of the airplane.

The displacer 60 can in particular be embodied or formed as a plate bent in the direction of the airfoil profile, in order to be able to optimally utilize the wing geometry.

The displacer 60 can be formed from or include, for example, a fiberboard with at least one thermal insulation property, having top a dark color on a top surface, e.g., a foam board painted black. A sufficiently stable board material can be provided, which also includes only a very low weight. The provision of a dark color on the top supports the heating up of the working gas 50 in the upper region, i.e., the upper chamber.

To this end, for example, the lift device in the region of the working chamber 52 on the top can have a light-transmitting cover 94. The light-transmitting cover 94 can be embodied or formed thereby, for example, in a transparent or also translucent manner, the important factor is that sufficient thermal radiation can enter the region of the working chamber 52. For example, shortwave solar radiation can enter the region in order to be converted there into longwave thermal radiation.

The cover or exterior skin of the wing device can thereby also at the same time form the chamber wall in the region of the working chamber 52.

Figure 4:
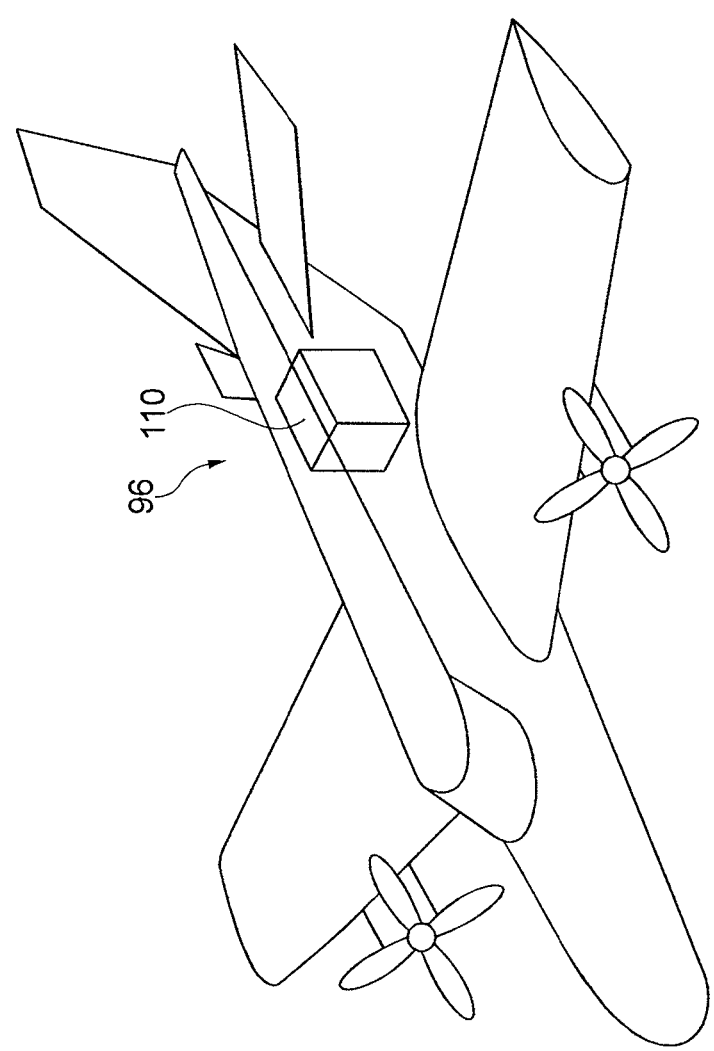
FIG. 4 illustrates a further exemplary embodiment of an aircraft according to the invention.

As shown in FIG. 4, a further exemplary embodiment is directed to a power-generating device 96 that is diagrammatically illustrated in FIG. 4, and can be provided for generating electric energy for driving the aircraft.

Figure 5:
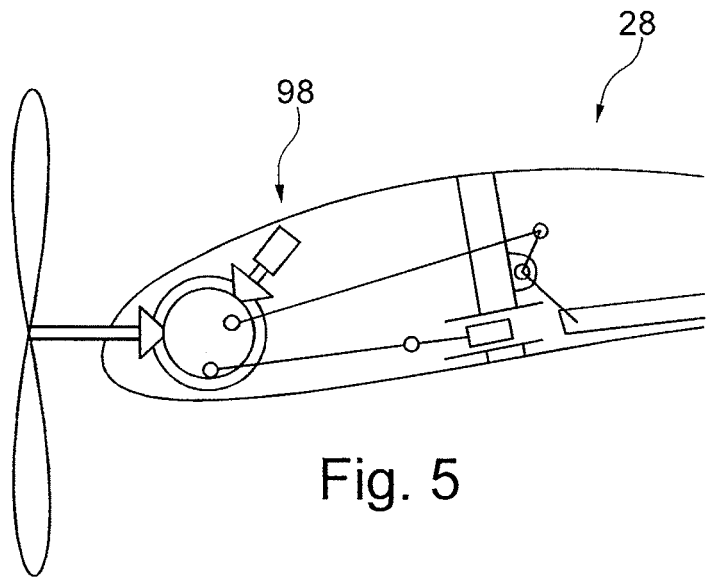
FIG. 5 illustrates a vertical section through a further exemplary embodiment of a wing device according to the invention.

For example, as shown in FIG. 5, the power-generating device 96 can comprise a generator device 98 for converting kinetic energy into electric energy. The generator device 98 is driven by the flat-plate Stirling engine 28.

At this point it should be noted that the connection of the inertia element 66 to the drive device, i.e., the propeller, as well as the connection to the generator device 98 are shown merely diagrammatically as a type of bevel gear connection. Of course, other transmission connection mechanisms can also be used here.

Figure 6:
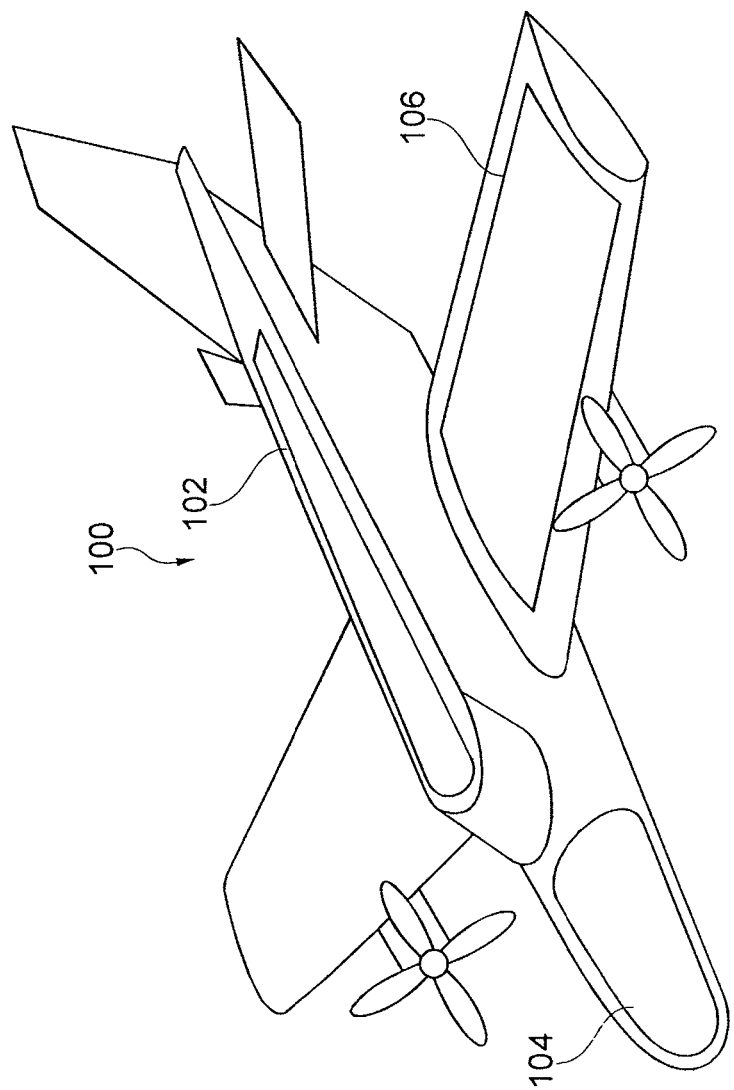
FIG. 6 illustrates a further exemplary embodiment of an aircraft according to the invention.

According to a further exemplary embodiment, the power-generating device 96 can have photovoltaic elements 100 for converting solar radiation into electric energy. FIG. 6 shows, for example, that the photovoltaic elements 100 can be arranged in the region of the roof construction 102 or in the region of the front airplane tip 104 and/or also in the region of the wings 106.

Figure 7:
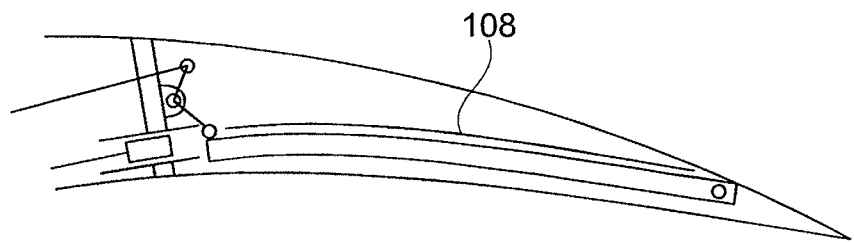
FIG. 7 illustrates a vertical section through a further exemplary embodiment of a wing device according to the invention.

According to a further exemplary embodiment, which is shown in FIG. 7, the photovoltaic elements are arranged on the top of the displacer, which is indicated by a double line 108.

Figure 8:
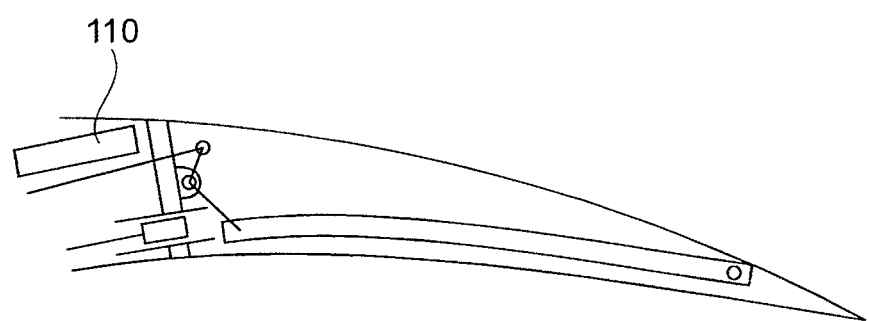
FIG. 8 illustrates a vertical section through a further exemplary embodiment of a wing device according to the invention.

The power-generating device 96 according to a further exemplary embodiment can also have a fuel cell device 110, for example, accommodated inside the fuselage construction, as is indicated diagrammatically in FIG. 4. The fuel cell device 110 can also be arranged inside a wing construction, as is shown in FIG. 8. It can thereby also be provided, for example, that the heat released with a fuel cell operation is fed to the working chamber of the flat-plate Stirling engine (not shown in further detail in FIG. 8).

According to a further exemplary embodiment, a heating device 112 for heating the working gas is provided in one of the two chamber regions of the working chamber of the flat-plate Stirling engine, i.e., in the hotter region of the working chamber.

Figure 9:
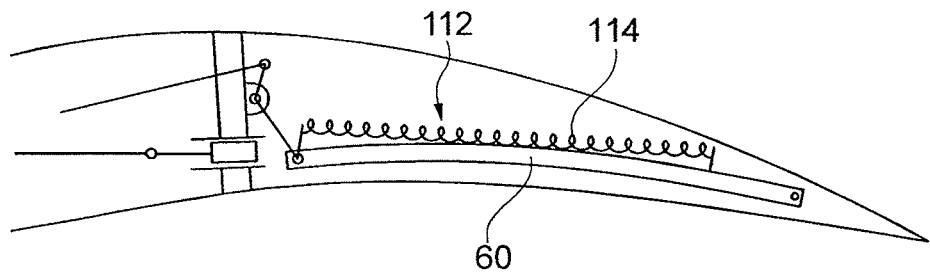
FIG. 9 illustrates a further exemplary embodiment of a wing device in vertical section with a heating device according to the invention.
Figure 15:
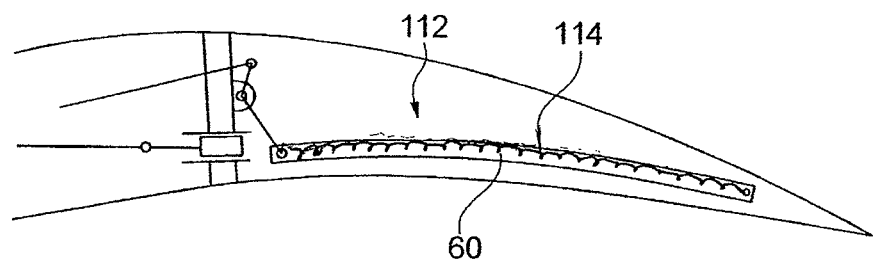
FIG. 15 illustrates a displacer with an integrally formed heating device.

For example, the heating device 112 can have an electric heating device 114 for converting electric energy into thermal energy. The electric heating device 114 is attached to the displacer 60, as is shown in FIG. 9, or the electric heating device 114 is embodied or formed, for example, integrally in the displacer 60, as is shown by the dashed lines in FIG. 15. The heating device 114 can be a heating coil, for example, as is indicated in FIG. 9 or as a resistance layer, not shown in detail, on the displacer 60, which produces heat inside the working chamber by electric energy.

Figure 10:
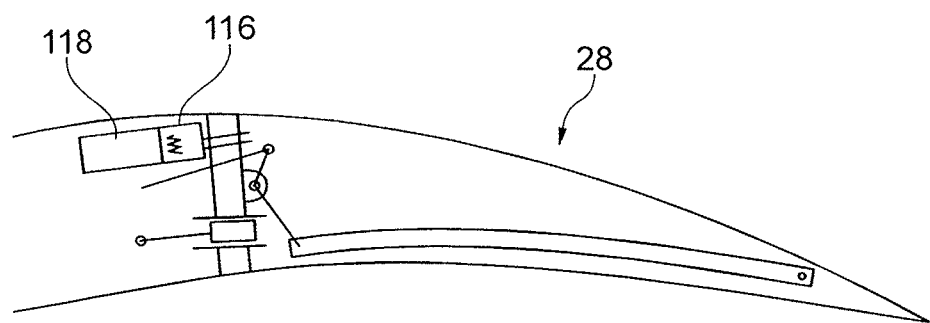
FIG. 10 illustrates a further exemplary embodiment of a wing device in vertical section with a further example of a heating device according to the invention.

According to a further exemplary embodiment of the invention, which is shown in FIG. 10, the heating device can have a combustion device 116 operated with a fuel. Additionally, a storage device 118 is provided to store the fuel. The combustion device 116 can be provided in the immediate vicinity of the flat-plate Stirling engine 28, as is indicated in FIG. 10, or at a different location, however, for example, inside the fuselage construction, in order to transport the heat from there to the flat-plate Stirling engine 28 (not shown in detail).

Figure 11:
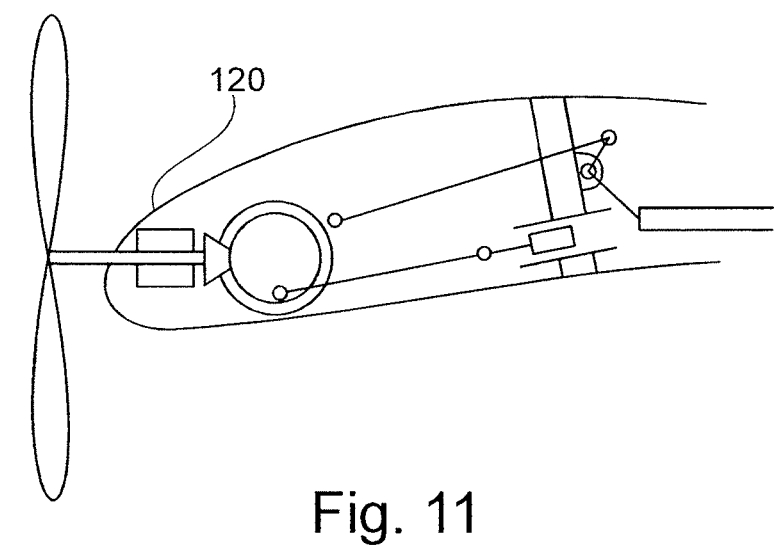
FIG. 11 illustrates a further exemplary embodiment of a wing device according to the invention in vertical section.

According to the exemplary embodiment shown in FIG. 11, an electric motor 120 connected to the drive device, for example, the propeller device 16, 18 and/or 41 and can be operated with electric energy of the power-generating device (not shown in detail in FIG. 11).

Figure 12:
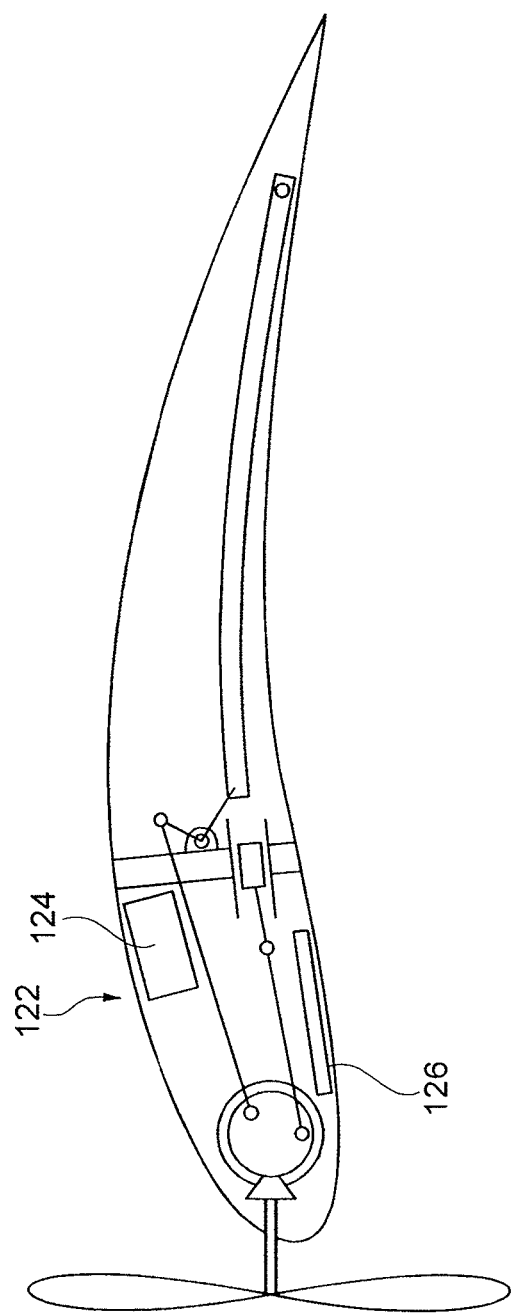
FIG. 12 illustrates a further exemplary embodiment of a wing device in vertical section according to the invention with a storage device for storing and delivering electric energy.

FIG. 12 shows a further exemplary embodiment in which a storage device 122 for storing and delivering the electric energy generated by the power-generating device 96 is provided. The power-generating device 96 feeds electric energy to the storage device 122 and the storage device 122 stores the fed electric energy and provides this for operating the aircraft.

FIG. 12 shows that the storage device 122, for example, is provided as a battery pack which can be accommodated at different locations inside the wing or also inside the fuselage construction (not shown in detail), as is indicated merely by way of example for a first position 124 and a second position 126.

The storage device 122, for example, delivers the electric energy to the electric heating device 114. The storage and the delivery of the electric energy by the storage device can thereby take place at different phases.

The storage device 122 can also however, additionally or alternatively, deliver the electric energy to an electric motor, for example, the electric motor 120, which is connected to the drive device.

According to an embodiment variant of the aircraft, the flat-plate Stirling engine 28 is embodied or formed with the photovoltaic elements 100, with which the electric motor 120 can be operated to support the flat-plate Stirling engine 28. It should be noted that this embodiment variant as well as the embodiment variants shown below are not represented, but the described combinations are understandable for the person skilled in the art from the above described representations of the individual components.

According to a further embodiment variant, the flat-plate Stirling engine 28 is combined with the photovoltaic elements 100 that deliver the electric current, which can be generated by the solar insolation during the day, to the battery and/or several batteries, i.e., the electric storage device 122, in order to generate a thrust with the electric motor 120 for times when solar thermal radiation is not available to the flat-plate Stirling engine 28.

According to a further embodiment variant, the flat-plate Stirling engine 28 is combined with the generator device 98, in order to conduct current to the storage device 122 during the day, in order subsequently to be able to operate the aircraft even in the dark by the electric motor 120. The generator 98 can be embodied or formed integrated with the electric motor 120, i.e., to put it simply, the electric motor 120 can also be used in the reverse direction as a generator.

According to a further embodiment variant, the flat-plate Stirling engine 28 is combined with the photovoltaic elements 100, and with the battery or the storage device 122. Moreover, the electric heating device 114 is provided, in order thus, for example, to feed thermal energy at night to the flat-plate Stirling engine 28, in order to be able to operate the drive device 14 with the flat-plate Stirling engine 28.

According to a further embodiment variant, the flat-plate Stirling engine 28 is combined with the generator or the generator device 98 and the storage device 122. The stored current can then be fed at night to the electric heating device 114 in order to operate the drive device 14. The embodiment of the generator is thereby in particular advantageous, which can be embodied or formed to be much smaller and lighter compared to an electric motor for driving the drive device.

According to a further embodiment variant, the flat-plate Stirling engine 28 is combined with the heating device or the combustion device 116, by which thermal energy can be generated during nighttime hours, and is fed to the flat-plate Stirling engine 28 in order to operate the drive device 14 therewith.

According to a further embodiment variant, the flat-plate Stirling engine 28 is combined with the photovoltaic elements 100, which operate the electric heating device 114 during the day in order to make additional heat available to the flat-plate Stirling engine 28 in addition to the solar thermal radiation. Due to the combination with the photovoltaic elements, the surface of the airplane, which is exposed to the solar insolation, or the thermal radiation can be used optimally and not only those regions that are arranged immediately above the flat-plate Stirling engine working chamber.

Of course, the embodiment variants described above can also be combined with one another in order to thus to make available overall the best possible utilization of the drive concept of the flat-plate Stirling engine 28.

Figure 13:
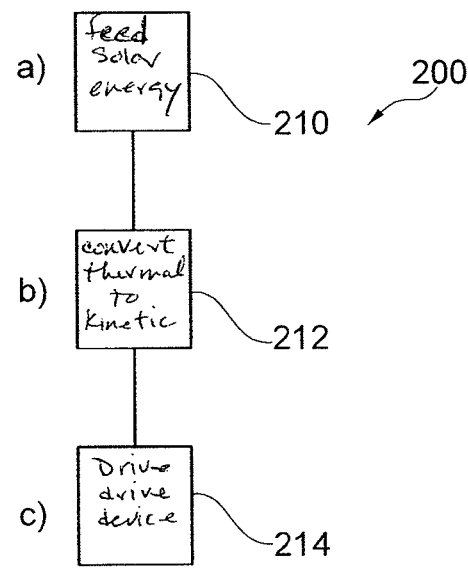
FIG. 13 illustrates process steps of a method according to the invention for driving an aircraft according to an exemplary embodiment of the invention.

Finally FIG. 13 shows a further exemplary embodiment of a method 200 for driving an aircraft, which comprises the following steps: in a first step 210, solar thermal energy is fed to a flat-plate Stirling engine which is provided in the aircraft as a heat engine, in order to drive a drive device to generate a thrust. In a second step 212, the thermal energy is converted by the flat-plate Stirling engine into kinetic energy. In a third step 214, a driving of the drive device by the flat-plate Stirling engine takes place.

The first step 210 is also referred to as step a), the second step 212 as step b) and the third step 214 as step c). The steps a), b) and c) naturally take place at the same time in a continuous manner during the operation of the aircraft.

Figure 14:
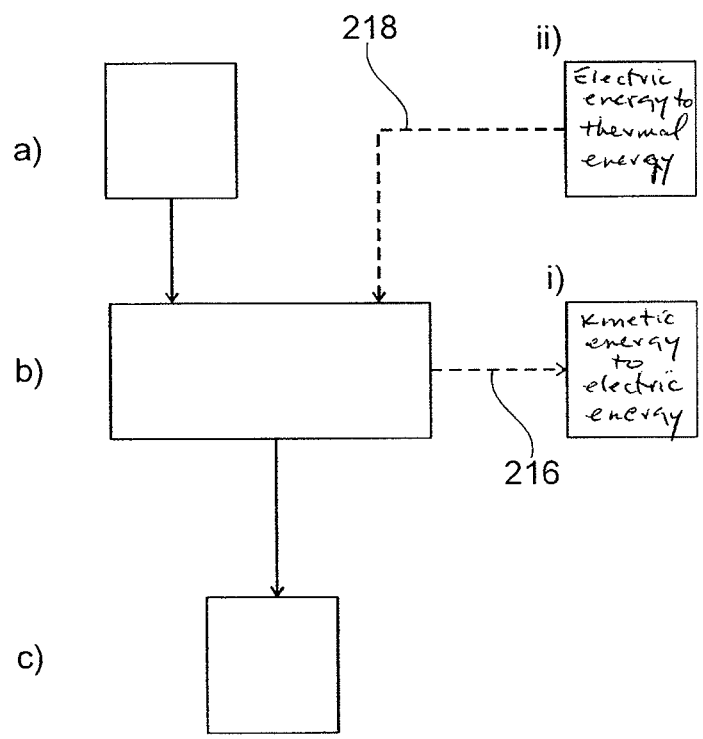
FIG. 14 illustrates a further example of a method according to the invention.

According to a further exemplary embodiment, which is shown in FIG. 14, in a first phase, kinetic energy of the flat-plate Stirling engine is converted into electric energy in a conversion operation 216 and is stored as electric energy. In a second phase, the stored electric energy is converted into thermal energy in a second conversion step 218 and thereby drives the Stirling engine in order to make available the kinetic energy for driving the driving device.

The first phase is also referred to as step i) and the second phase as step ii). The first phase is provided, for example, with existing solar thermal radiation and the second phase with reduced or unavailable solar thermal radiation, for example at night. The storage and delivery of the electric energy by the storage device thus takes place at different phases, for example, which is why the connection arrows of the first conversion step 216 and the second conversion step 218 are shown by dashed lines in each case.

According to a further exemplary embodiment, but not shown in detail, it is provided with the method that the kinetic energy is converted into electric energy by the generator mentioned above. Additionally or alternatively, the electric energy can also be made available, for example, by photovoltaic elements or also by a fuel cell, as was explained above based on the different device variants, which is why an explicit representation of corresponding method diagrams is omitted.

According to a further aspect of the invention, due to the combination of the flat-plate Stirling engine with an additional generation of electric energy during the day and the delivery of the electric energy and subsequent conversion into thermal energy at night, an airplane is possible that flies permanently or in an unlimited manner, which derives its drive from solar heat. In addition to the solar insolation during the day for the Stirling engine, at night as it were an alternative energy source is provided, which can be stored during the day to be available at night. To this end the heat is converted into movement from the heat engine in the form of the Stirling engine and the movement is converted into current by a generator. A battery can therefore store the excess energy during the day in order to convert it at night into heat again and to thereby drive the heat engine in the form of the flat-plate Stirling engine. In particular, the high efficiency of the flat-plate Stirling engine with the utilization of the thermal energy and the high yield of the electric energy with the generation of thermal energy is to be noted, which overall ensures high efficiency.

The exemplary embodiments described above can be combined in different ways.

In addition it should be noted that "comprising" does not exclude any other elements or steps and "one" does not exclude a plural. Furthermore, it should be noted that features or steps that have been described with reference to one of the above exemplary embodiments can also be used in combination with other features or steps of other exemplary embodiments described above.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An aircraft with at least one heat engine, the aircraft comprising:
   a wing and a fuselage;
   a working chamber of the at least one heat engine, having a top and an underside filled with a working gas, being located in at least one of the wing and fuselage;
   a displacer of the at least one heat engine being structured and arranged for pivoting movement between the top and the underside of the working chamber to a define a first and a second chamber region; and
   a heating region of the at least one heat engine being located in a region of the top of the working chamber to receive solar thermal radiation through the at least one of the wing and fuselage to heat the working gas,
   wherein the at least one of the wing and fuselage has an external skin that forms a wall of the working chamber.

2. The aircraft according to claim 1, the heat engine comprising a flat-plate Stirling engine.

3. The aircraft according to claim 1, further comprising:
   a regenerator of the at least one heat engine being structured and arranged in the working chamber to collect and deliver thermal energy contained in the working gas;
   a rotatable inertia element of the at least one heat engine comprising at least one of a propeller or a flywheel; and
   a driver of the at least one heat engine being structured and arranged to be connectable to the rotatable inertia element to drive a thrust drive.

4. The aircraft according to claim 1, further comprising an electric storage structured and arranged to store and deliver electric energy generated by a power-generator coupled to the heat engine to convert kinetic energy into electric energy.

5. An aircraft with an emission-free drive, comprising:
   an aircraft thruster structured and arranged to generate thrust force on the aircraft;
   a wing structured and arranged to impart lift on the aircraft;
   a fuselage; and
   a heat engine, which is structured and arranged to convert thermal energy into kinetic energy to drive the aircraft thruster, comprising at least one flat-plate Stirling engine drivable by solar thermal radiation,
   wherein the at least one flat-plate Stirling engine comprises:
      a working chamber having a top and an underside; and
      a displacer structured and arranged for pivoting movement between the top and the underside of the working chamber to a define a first and a second chamber region,
   wherein at least one of the wing and the fuselage has an external skin that forms a wall of the working chamber.

* * * * *